United States Patent
Prahlad et al.

(10) Patent No.: US 11,146,556 B2
(45) Date of Patent: Oct. 12, 2021

(54) METHODS AND SYSTEMS FOR CONTIGUOUS UTILIZATION OF INDIVIDUAL END-USER-BASED CLOUD-STORAGE SUBSCRIPTIONS

(71) Applicant: Parablu Inc., Santa Clara, CA (US)

(72) Inventors: Anand Prahlad, Bangalore (IN); Inbaraj Karuthakannan, Bangalore (IN)

(73) Assignee: Parablu Inc., Santa Clara, CA (US)

( * ) Notice: Subject to any disclaimer, the term of this patent is extended or adjusted under 35 U.S.C. 154(b) by 336 days.

(21) Appl. No.: 16/297,759

(22) Filed: Mar. 11, 2019

(65) Prior Publication Data

US 2020/0296100 A1 Sep. 17, 2020

(51) Int. Cl.
| | |
|---|---|
| *H04L 29/06* | (2006.01) |
| *G06F 9/50* | (2006.01) |
| *G06F 3/06* | (2006.01) |
| *G06F 16/908* | (2019.01) |
| *G06F 21/60* | (2013.01) |

(52) U.S. Cl.
CPC .......... *H04L 63/0884* (2013.01); *G06F 3/067* (2013.01); *G06F 3/0622* (2013.01); *G06F 3/0641* (2013.01); *G06F 3/0667* (2013.01); *G06F 9/5016* (2013.01); *G06F 16/908* (2019.01); *G06F 21/602* (2013.01)

(58) Field of Classification Search
CPC . H04L 63/0884; G06F 3/0622; G06F 3/0641; G06F 3/0667; G06F 3/067; G06F 9/5016; G06F 21/602; G06F 16/908

USPC .............................................. 726/4; 707/654
See application file for complete search history.

(56) References Cited

U.S. PATENT DOCUMENTS

| | | | |
|---|---|---|---|
| 9,317,419 B1* | 4/2016 | Bono ...................... | G06F 3/064 |
| 9,852,149 B1* | 12/2017 | Taylor ................. | G06F 11/2089 |
| 2014/0136485 A1* | 5/2014 | Miyoshi ................ | G06F 3/0617 |
| | | | 707/654 |
| 2015/0312243 A1* | 10/2015 | Ponsford ............. | H04L 63/0457 |
| | | | 713/159 |
| 2016/0366580 A1* | 12/2016 | Cao .......................... | H04W 8/16 |
| 2016/0371021 A1* | 12/2016 | Goldberg .............. | G06F 3/0652 |
| 2017/0344618 A1* | 11/2017 | Horowitz ............ | G06F 11/2097 |

(Continued)

*Primary Examiner* — Prabodh M Dharia
(74) *Attorney, Agent, or Firm* — Reuven K. Mouallem; FlashPoint IP Ltd.

(57) ABSTRACT

The present invention discloses methods and systems for contiguous utilization of individual end-user-based cloud-storage subscriptions. Methods including the steps of: upon receiving a write request for writing a data file into at least one cloud-storage allocation unit, identifying unused available storage in the cloud-storage allocation unit; fragmenting the data file into chunk files; encrypting each chunk file; writing each chunk file to the cloud-storage allocation unit to satisfy the write request; and updating a metadatabase having metadata associated with the data file and the chunk files. Alternatively, the method further includes: upon receiving a read request for reading the data file from at least one cloud-storage allocation unit, performing lookup in the metadatabase of the metadata; reading each chunk file from the cloud-storage allocation unit; decrypting each chunk file; reassembling the chunk files into the data file using the metadata; and providing the data file to satisfy the read request.

17 Claims, 5 Drawing Sheets

Exemplary Embodiment

(56) References Cited

U.S. PATENT DOCUMENTS

2017/0351664 A1\* 12/2017 Hahn ................... G06F 40/289
2020/0201827 A1\* 6/2020 Chacko ............... G06F 21/6218

\* cited by examiner

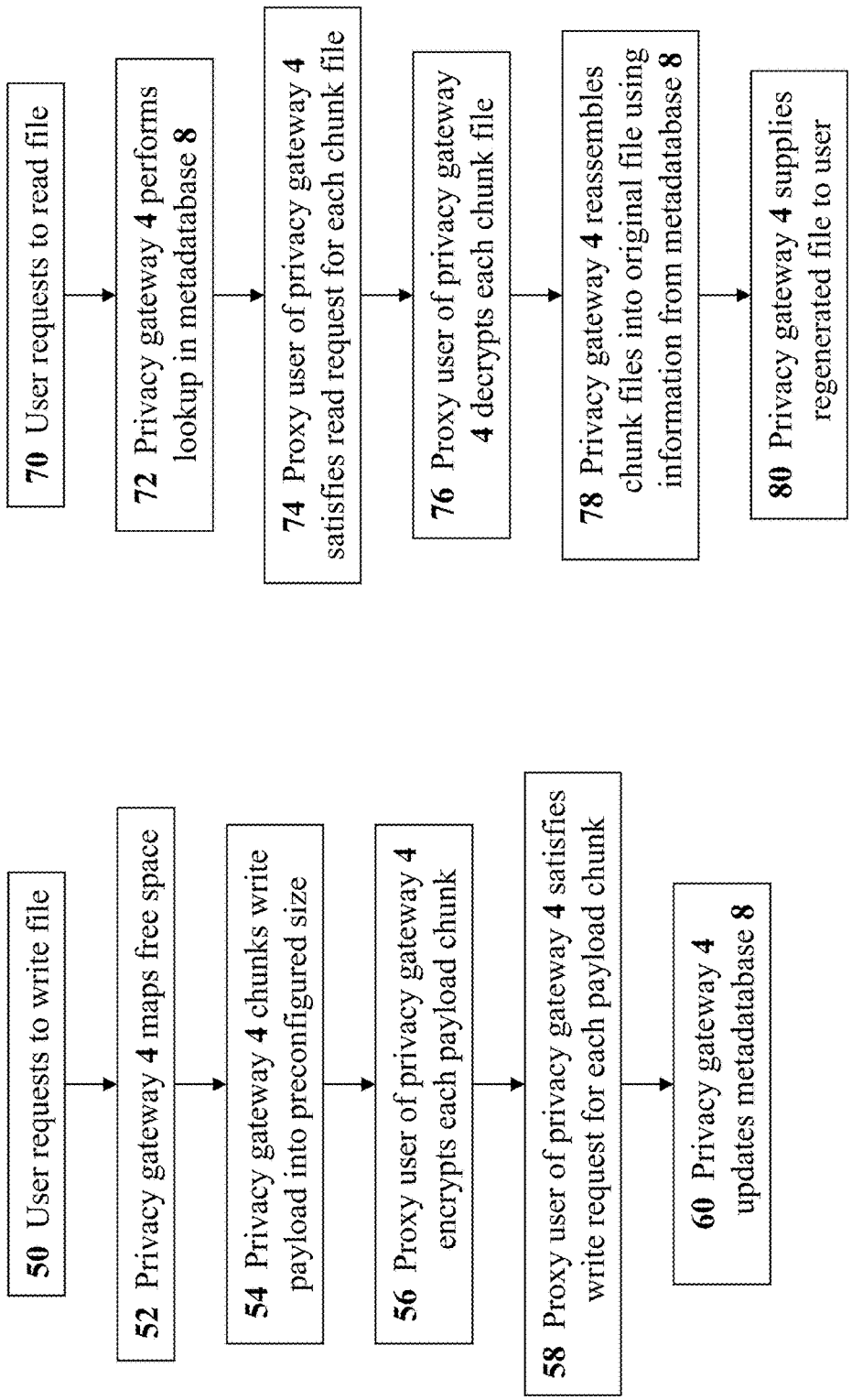

METHODS AND SYSTEMS FOR CONTIGUOUS UTILIZATION OF INDIVIDUAL END-USER-BASED CLOUD-STORAGE SUBSCRIPTIONS

FIELD AND BACKGROUND OF THE INVENTION

The present invention relates to methods and systems for contiguous utilization of individual end-user-based cloud-storage subscriptions.

Businesses are increasingly investing in cloud storage for use by their knowledge workers. This usually happens in the form of subscription purchases such as Microsoft OneDrive for Business or Google Drive. Such cloud-storage subscriptions are typically bundled as part of end-user application suites such as Microsoft Office 365 or Google G-Suite.

The end-user storage subscriptions thus acquired are quite liberal, and can range anywhere from 1 TB/user to even unlimited storage, depending on the type of subscription. Most knowledge workers utilize only a small portion of such allocated cloud storage, leaving plenty of unused storage that their employer still pays for annually as part of the subscription. Since these end-user storage subscriptions are tied to individual end-user logins, the businesses don't have a straightforward way of reclaiming the unused storage space for alternative use.

In the prior art, US Patent Publication No. 2018/0115551 by Cole discloses a computer process for obtaining cloud credential data for accessing one or more cloud accounts of a cloud computing system having one or more computing resources available for provisioning to one or more client machines; establishing at least one proxy account associated with the one or more cloud accounts of the cloud computing system, the at least one proxy account including at least proxy credential data and access to at least one provisioning policy, the at least one provisioning policy including one or more provisioning constraints with respect to provisioning the one or more computing resources which one or more provisioning constraints are not present in the one or more cloud accounts; and applying the one or more provisioning constraints of the at least one provisioning policy with respect to all provisioning requests of the one or more client machines that originate via the at least one proxy account to limit provisioning of the one or more computing resources that would otherwise be available from the cloud computing system via the one or more cloud accounts.

Such proxies are entrusted with complete authorization to access the entire cloud-storage space, which they disseminate in rationed amounts based on set policies or rules. The proxies maintain such access, including access to all end-user content, throughout an end-user's subscription. Such configurations raise serious concerns about user and content privacy, even when encryption protocols are employed.

It would be desirable to have methods and systems methods and systems for contiguous utilization of individual end-user-based cloud-storage subscriptions. Such methods and systems would, inter alia, overcome the various limitations mentioned above.

SUMMARY

It is the purpose of the present invention to provide methods and systems for contiguous utilization of individual end-user-based cloud-storage subscriptions.

It is noted that the term "exemplary" is used herein to refer to examples of embodiments and/or implementations, and is not meant to necessarily convey a more-desirable use-case. Similarly, the terms "alternative" and "alternatively" are used herein to refer to an example out of an assortment of contemplated embodiments and/or implementations, and is not meant to necessarily convey a more-desirable use-case. Therefore, it is understood from the above that "exemplary" and "alternative" may be applied herein to multiple embodiments and/or implementations. Various combinations of such alternative and/or exemplary embodiments are also contemplated herein.

For purposes of clarity, several terms are defined herein. The term "chunk" is used herein to refer is a fragment of information. The term "chunk file" is used herein to refer is a portion of a fragmented data file. The term "chunking" is used herein to refer to the process of fragmenting a data file into chunk files.

Embodiments of the present invention enable unused storage in end-user cloud-storage subscriptions to be harnessed by an enterprise for use as if the individual, isolated storage allocations were a single, contiguous storage unit. To satisfy typical enterprise needs regarding storage, embodiments of the present invention also ensure that all data moved to the cloud is stored in a secure digital container. All data written into the digital container is fully encrypted (with enforcement of strict separation of duties), versioned, searchable, de-duplicated, and fully audit-logged.

Embodiments of the present invention further ensure that the data recorded in the storage unit by the end user and by the enterprise are kept separated, with exclusive access to each ensured. Such implementations overcome limitations that are commonly found with such end-user cloud subscriptions (e.g., limits on file sizes, folder sizes, folder depth, and special characters). Implementations of the present invention can be deployed as software running on a server (or a plurality of servers for load-balancing and fail-over), referred to herein as a privacy gateway.

While prior-art proxies have "omnipotent access" to an entire cloud-storage space, embodiments of the present invention "limited powers" in that the privacy gateway can only read and write pre-encrypted data streams, without the ability to interpret or decrypt the content. Moreover, the privacy gateway can write only to specific portions of various user storage allocations, which can be set using security artifacts.

Given that the privacy gateway is a proxy, it is a single entity that represents all other users. As a use case, consider a storage allocation unit for a user A. The privacy gateway can record data of a user B in user A's storage unit with user B's data being encrypted using user B's encryption keys. The privacy gateway can similarly record a user C's data and user D's data in user A's storage unit with user C's and D's data being encrypted with user C's and D's encryption keys, respectively (as detailed below).

Ensuring that a portion of user A's storage unit is accessible for all other users (i.e., making it available space to be assigned) is a daunting task for any administrator. However, the privacy gateway acts as a representative for all other users, providing a convenient way to partition storage for all other users.

In order to accomplish this, a portion of unused storage has to be carved out of each individual storage unit, and made part of a general pool. The main challenge with being able to utilize storage in such individually-allocated storage units is authentication. Access to each cloud-storage unit is typically governed by authentication credentials belonging to the user whom the storage is allocated to. In order to overcome this, the privacy gateway relies on a single proxy user to manage all reads and writes from the collection of containers.

Whereas prior-art proxies represents a business-entity "top down" perspective (i.e., the proxy partitions and provides limited access from its complete access to the entire usage space, even having access to all end-user content), the privacy gateway of the present invention represents an end-user "bottom up" perspective (i.e., the proxy obtains access on behalf of the end-user and from another end-user on an individual case-by-case basis once authorized, and even then such a proxy doesn't have access to the end-user content stored in the space that the proxy obtains).

Therefore, according to the present invention, there is provided for the first time a method for contiguous utilization of individual end-user-based cloud-storage subscriptions, the method including the steps of: (a) upon receiving a write request for writing a data file into at least one cloud-storage allocation unit, identifying unused available storage in at least one cloud-storage allocation unit; (b) fragmenting the data file into chunk files; (c) encrypting each chunk file; (d) writing each chunk file to at least one cloud-storage allocation unit to satisfy the write request; and (e) updating a metadatabase having metadata associated with the data file and the chunk files.

Alternatively, the method further includes the steps of: (f) upon receiving a read request for reading the data file from at least one cloud-storage allocation unit, performing lookup in the metadatabase of the metadata; (g) reading each chunk file from at least one cloud-storage allocation unit; (h) decrypting each chunk file; (i) reassembling the chunk files into the data file using the metadata; and (j) providing the data file to satisfy the read request.

Alternatively, the metadata includes at least one informational tag selected from the group consisting of: a chunk name, a chunk location, a chunk signature, a unique chunk signature, a cloud-storage location.

Alternatively, the step of identifying and/or the step of writing include validating authorization to access at least one cloud-storage allocation unit using at least one proxy user credential or at least one cached access token.

Alternatively, the step of reading and/or the step of reassembling include validating authorization to access at least one cloud-storage allocation unit using at least one proxy user credential or at least one cached access token.

According to the present invention, there is provided for the first time a system for contiguous utilization of individual end-user-based cloud-storage subscriptions, the system including: (a) a CPU for performing computational operations; (b) a memory module for storing data; (c) a privacy-gateway module configured for providing the contiguous utilization of cloud storage, the privacy-gateway module including: (i) a gateway-receiver component configured for receiving a write request for writing a data file into at least one cloud-storage allocation unit and storing the data file in a cache of the memory module; (ii) a storage-mapping component configured for identifying unused available storage in at least one cloud-storage allocation unit; (iii) a file-chunking component configured for fragmenting the data file into chunk files; (iv) an encryption component configured for encrypting each chunk file; (v) a cloud-writer component configured for writing each chunk file to at least one cloud-storage allocation unit to satisfy the write request; and (vi) a metadata-lookup component configured for performing lookup and/or updating a metadatabase having metadata associated with the data file and the chunk files.

Alternatively, the gateway-receiver component is further configured for receiving a read request for reading the data file from at least one cloud-storage allocation unit, and wherein the privacy-gateway module further includes: (vii) a cloud-reader component for reading each chunk file from at least one cloud-storage allocation unit; (viii) a decryption component configured for decrypting each chunk file; (ix) a file-reassembly component configured for reassembling the chunk files into the data file using the metadata; and (x) a gateway-sender component configured for providing the data file to satisfy the read request.

Alternatively, the metadata includes at least one informational tag selected from the group consisting of: a chunk name, a chunk location, a chunk signature, a unique chunk signature, a cloud-storage location.

Alternatively, the privacy-gateway module further includes: (vii) a credential-lookup component configured for performing lookup of at least one proxy user credential or at least one cached access token; and (viii) a cloud-authentication component configured for validating authorization to access at least one cloud-storage allocation unit using at least one proxy user credential or at least one cached access token.

Most alternatively, the storage-mapping component is further configured for serving as a chunk-mapping component and as a location-mapping component to map chunk names and chunk locations in the metadatabase.

Alternatively, the privacy-gateway module further includes: (vii) a deduplication component configured for generating unique signatures for each chunk file; and (viii) a signature-lookup component configured for performing lookup of the unique signatures in the metadatabase.

Alternatively, the privacy-gateway module further includes: (vii) an initialization vector-lookup component configured for creating and performing lookup of initialization vectors for generating user encryption keys during the encrypting.

According to the present invention, there is provided for the first time a non-transitory computer-readable storage medium, having computer-readable code embodied on the non-transitory computer-readable storage medium, for contiguous utilization of individual end-user-based cloud-storage subscriptions, the computer-readable code including: (a) program code for, upon receiving a write request for writing a data file into at least one cloud-storage allocation unit, identifying unused available storage in at least one cloud-storage allocation unit; (b) program code for fragmenting the data file into chunk files; (c) program code for encrypting each chunk file; (d) program code for writing each chunk file to at least one cloud-storage allocation unit to satisfy the write request; and (e) program code for updating a metadatabase having metadata associated with the data file and the chunk files.

Alternatively, the computer-readable code further includes: (f) program code for, upon receiving a read request for reading the data file from at least one cloud-storage allocation unit, performing lookup in the metadatabase of the metadata; (g) program code for reading each chunk file from at least one cloud-storage allocation unit; (h) program code for decrypting each chunk file; (i) program code for reassembling the chunk files into the data file using the metadata; and (j) program code for providing the data file to satisfy the read request.

Alternatively, the metadata includes at least one informational tag selected from the group consisting of: a chunk name, a chunk location, a chunk signature, a unique chunk signature, a cloud-storage location.

Alternatively, the computer-readable code further includes: (f) program code for performing lookup of at least one proxy user credential or at least one cached access token; and (g) program code for validating authorization to access at least one cloud-storage allocation unit using at least one proxy user credential or at least one cached access token.

These and further embodiments will be apparent from the detailed description and examples that follow.

BRIEF DESCRIPTION OF THE DRAWINGS

The present invention is herein described, by way of example only, with reference to the accompanying drawings, wherein:

FIG. 5A is a simplified flowchart of the major process steps for performing a write operation using the system architecture FIG. 2, according to embodiments of the present invention, according to embodiments of the present invention;

FIG. 5B is a simplified flowchart of the major process steps for performing a read operation using the system architecture FIG. 2, according to embodiments of the present invention, according to embodiments of the present invention.

DESCRIPTION OF THE ILLUSTRATIVE EMBODIMENTS

The present invention relates to methods and systems for methods and systems for contiguous utilization of individual end-user-based cloud-storage subscriptions. The principles and operation for providing such methods and systems, according to the present invention, may be better understood with reference to the accompanying description and the drawings.

Figure 1:
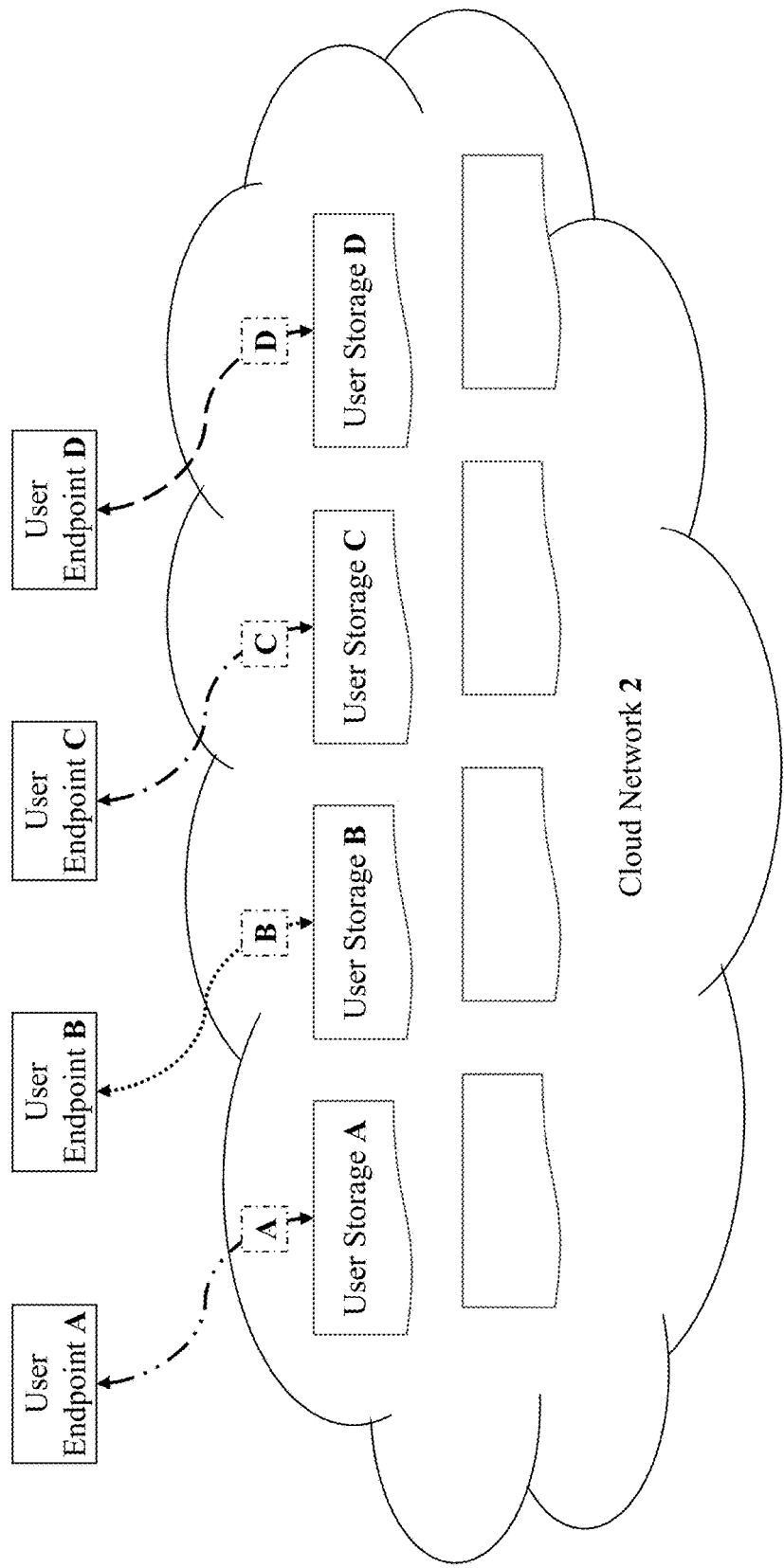
FIG. 1 is a simplified high-level schematic diagram of a typical system architecture for end-user cloud-storage subscriptions, according to the prior art.

Referring to the drawings, is FIG. 1 is a simplified high-level schematic diagram of a typical system architecture for end-user cloud-storage subscriptions, according to the prior art. A cloud network 2 provides cloud storage allocated to exemplary user endpoints A, B, C, and D, designated as exemplary user storage A, user storage B, user storage C, and user storage D in FIG. 1. Note that the arrows indicating data exchange between user endpoints A-D and their respective user storages A-D are depicted with different dashed lines (depicted as encryption channels A-D) to indicate that each user exchanges data (i.e., perform read/write operations) with his/her own encryption keys.

However, in order for cloud network 2 to readily be able to allocate new user storage, cloud network 2 has to have ubiquitous access at all times to be able to manage all subscription accounts, storage capacity, and unallocated space (depicted as blank storage icons in FIG. 1). In such a configuration, cloud network 2 cannot utilize the unused resources by the end users in user storages A-D, represented in FIG. 1 as respective unused portions X.

Figure 2:
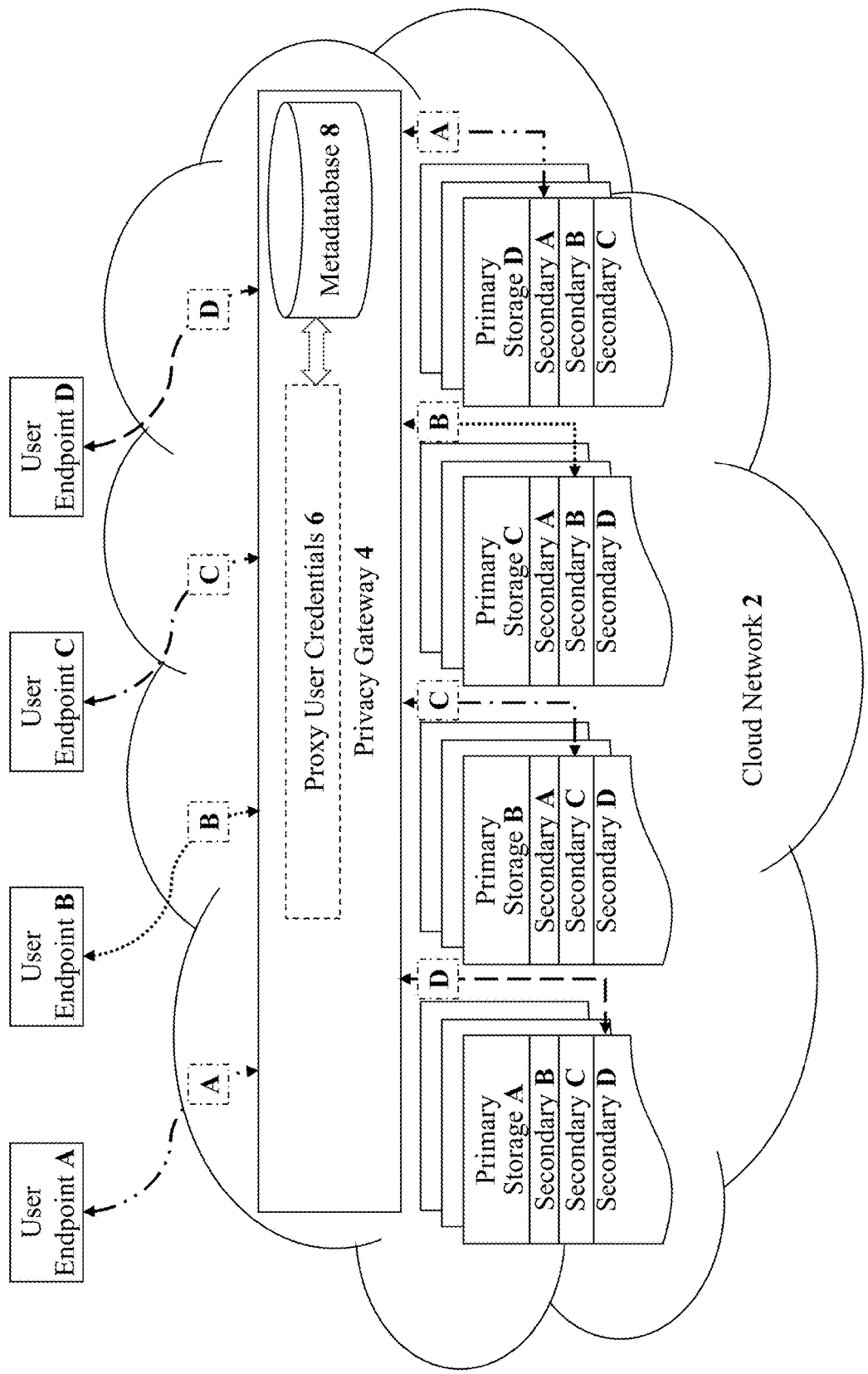
FIG. 2 is a simplified high-level schematic diagram of the system architecture for contiguous utilization of individual end-user-based cloud-storage subscriptions, according to embodiments of the present invention.

FIG. 2 is a simplified high-level schematic diagram of the system architecture for contiguous utilization of individual end-user-based cloud-storage subscriptions, according to embodiments of the present invention. A privacy gateway 4 is shown in cloud network 2, serving as a proxy between end users and the user storage. Let us assume for simplicity that there are four users working on their respective endpoints with a cloud-storage account allocated to each end user: user endpoints A-D.

In FIG. 2, user storage is designated as primary storages A-D containing exclusively allocated space to secondaries A-D as well, which are the unused portions of primary storages A-D, respectively. In such a configuration, privacy gateway 4 uses proxy user credentials 6 and a metadatabase 8 for the end users to access user storage for a given end user on any storage unit, whether it is a primary storage or secondary unit.

There are several accompanying challenges to such an arrangement, mainly relating to how privacy of data is ensured. Specifically, such challenges include:
 (a) The proxy user cannot have full read/write privileges to the storage unit because doing so would defeat any privacy the user could claim by having their own segregated storage allocation.
 (b) The proxy user can work as an agent for reading and writing data into the portions of the storage units allocated for the general pool but should not become a means by which it is used to access any information written into the general pool by other users.
 (c) The owner of the individual storage unit should not be able to gain access to information recorded in the portion of the storage that has been allocated out of the storage unit to the general pool.

In order to overcome the above challenges, privacy gateway 4 uses user security artifacts (i.e., proxy user credentials 6) available natively as part of the cloud-storage offering of cloud network 2, combined with encryption, to ensure that the proxy user (i.e., privacy gateway 4) has full read/write privileges to only a specific section (e.g., a folder designated as secondaries A-D) of each user's cloud storage allocation (e.g., primary storages A-D), and has no privileges in the rest of the primary storage area.

Encryption channels A-D are used by privacy gateway 4 to access secondary storage areas regardless of the primary storage area in which the secondary storage is located in. For example, in primary storage A of FIG. 2, encryption channel D is used to access secondary D.

Figure 3:
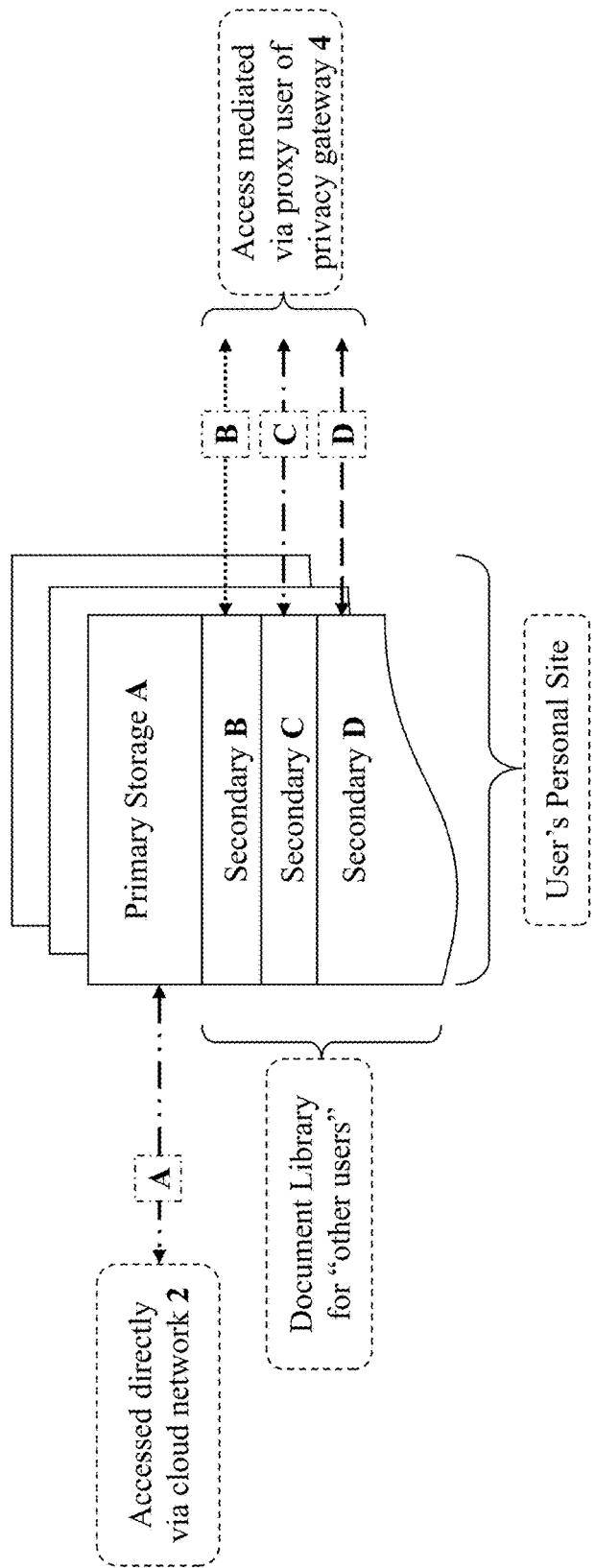
FIG. 3 depicts primary storage A and secondaries B-D of FIG. 2 with how operative encryption channels A-D are accessed, according to embodiments of the present invention.

FIG. 3 depicts primary storage A and secondaries B-D of FIG. 2 with how operative encryption channels A-D are accessed, according to embodiments of the present invention. Using the exemplary implementation described above, both primary storage A and secondaries B-D together would comprise the storage allocation unit of the user's Personal Site; whereas, secondaries B-D would comprise the Document Library. Primary storage A is accessed by user endpoint A directly via cloud network 2, while access to secondaries B-D is mediated via the proxy user of privacy gateway 4.

As an exemplary implementation, in the case of Microsoft OneDrive for Business, such a "partitioned" storage for "other users" as described above with regard to FIG. 2 is designated a "Document Library." Such a Document Library is created in each user's "Personal Site" (i.e., storage allocation unit), and applies permissions using the OneDrive security scheme such that only the proxy user called "PBAdmin" (i.e., privacy gateway 4) has full read/write privileges to the Document Library. Such a configuration also ensures that PBAdmin has no access rights whatsoever in any other portion of the user's Personal Site outside of the Document Library.

The act of ensuring that the proxy user has read/write privileges only to a specific section of each user's cloud storage allocation is a configuration step performed by the cloud administrator once on behalf of all users by a specially-created utility, solving the challenge enumerated in (a) above. Such an implementation also ensures that the data stream handled by the proxy user for read/write operations is always encrypted, solving the challenge enumerated in (b) above. Finally, the technique ensures that the data recorded in the portions of the various individual storage units that are carved out for use by the general pool is always encrypted, solving the challenge enumerated in (c) above.

The authentication process described above of privacy gateway 4 is configured via a single proxy user. All end-user data is written to the vector of storage containers via the proxy user. The proxy user of privacy gateway 4 only has privileges to read and write encrypted payloads into a designated area of a storage unit; the proxy user has no ability to read or write data anywhere outside the designated area. Reading data from designated area only results in reading encrypted content; therefore, no confidentiality is compromised.

Examples of how read/write operations occur once the authentication process is configured as described above with regard to FIGS. 2 and 3 are provided below. The process for writing a file is as follows.

1. User endpoint A writes a file into cloud network 2.
2. The write request first reaches privacy gateway 4.
3. Privacy gateway 4 checks the free space in all allocation units, and determines which cloud-storage allocation unit to send the write request to. Privacy gateway 4 may decide to write to primary storage C.
4. The file is then broken up into 'chunk files' of a pre-determined, but configurable size. This size is selected so as to not exceed the file-size limit of the cloud-storage vendor (i.e., cloud network 2).
5. Each of the chunk files is encrypted individually. The chunk files are named appropriately in order to be unique, and not contain any characters not permitted by the cloud-storage vendor.
6. Proxy user credentials 6 are then employed to write each of the chunk files into the cloud-storage allocation unit determined above.
7. When writing the file, the number of files in the folder, into which the chunk file is being written into, is checked in order to ensure that the folder-size limit of the cloud-storage vendor isn't exceeded.
8. Metadatabase 8 is updated to reflect the location of the chunk files (i.e., which storage unit and relative folder path were written into).

It is understood that the privacy gateway described herein may include its own integrated componentry (i.e., hardware, firmware, and/or software) for performing its prescribed functions. Thus, structural componentry such as processors, memory modules, instruction sets, and communication hardware and protocols are implicitly included in the description of the privacy gateway.

Figure 4:
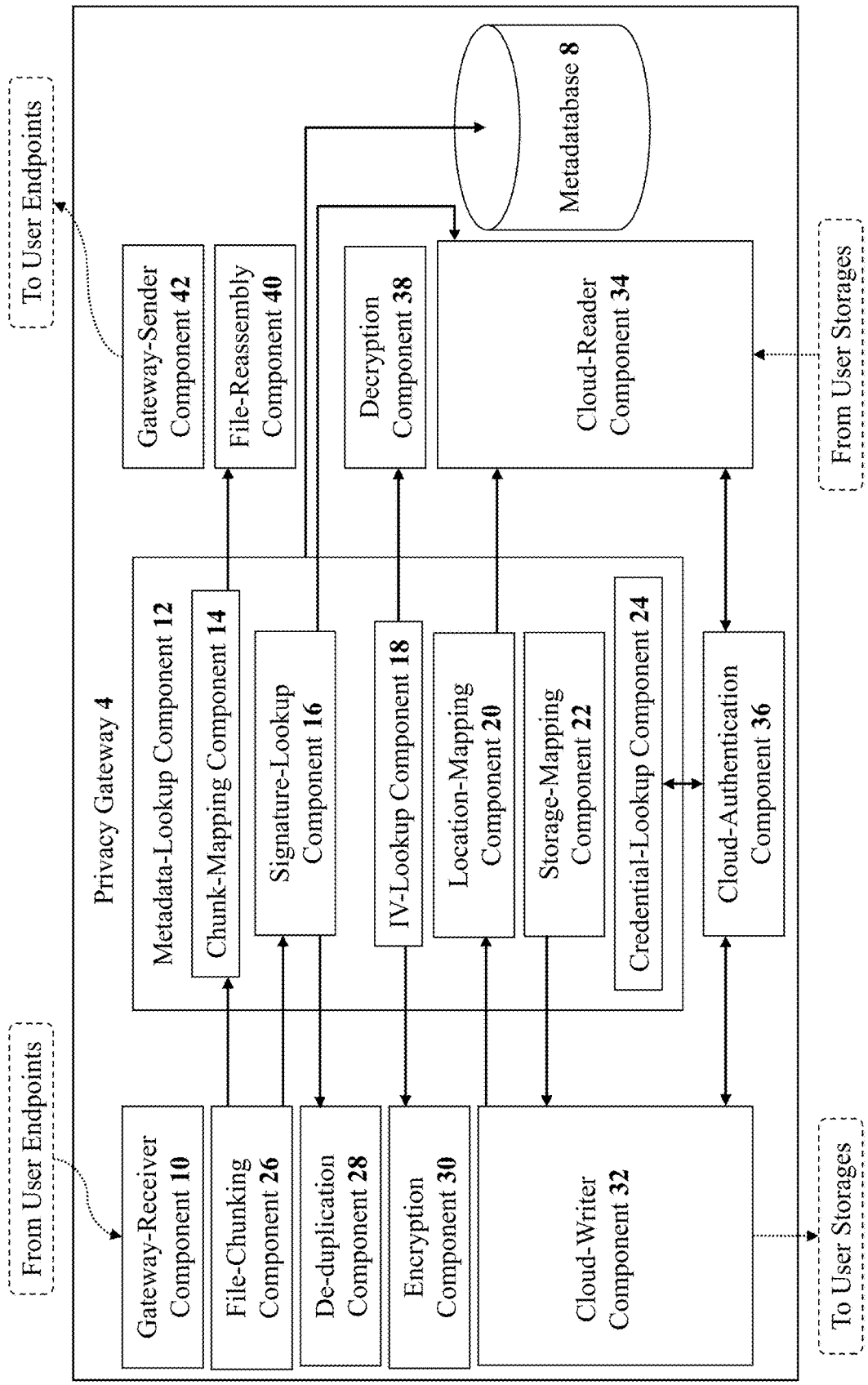
FIG. 4 is a simplified high-level block diagram of the components of the privacy gateway of FIG. 2, according to embodiments of the present invention.

In implementation, privacy gateway 4 of FIG. 2 includes several components in order to perform the functional operations described above. FIG. 4 is a simplified high-level block diagram of the components of the privacy gateway of FIG. 2, according to embodiments of the present invention. Such components may be implemented as separate components or as integrated components performing several functional operations.

Privacy gateway 4 is shown having a gateway-receiver component 10 configured for receiving compressed data streams transmitted concurrently from multiple end-user devices (shown as user endpoints in FIG. 4), and saving the data streams in a cache memory (not shown) of privacy gateway 4. Such data streams are classified by user and device ID.

A metadata-lookup component 12 is configured to allow other components to rapidly lookup and/or update information, handling several metadata functions. Among such functions, metadata-lookup component 12 includes a chunk-mapping component 14 configured for mapping/recording/lookup of chunk-file names and locations in metadatabase 8, mapped to corresponding user data files. A signature-lookup component 16 (in metadata-lookup component 12) is configured for mapping/recording/lookup of chunk files to unique signatures in metadatabase 8, mapped to corresponding chunk files.

An IV-lookup component 18 (in metadata-lookup component 12) is configured for creating/lookup of initialization vectors (IVs) for generating user encryption keys during encryption/decryption. A location-mapping component 20 (in metadata-lookup component 12) is configured for mapping/recording/lookup of cloud-location information in metadatabase 8 corresponding to each chunk file. A storage-mapping component 22 (in metadata-lookup component 12) is configured for lookup of target cloud-storage allocation units (shown as user storages in FIG. 4) to which a user's data stream is destined. A credential-lookup component 24 (in metadata-lookup component 12) is configured for lookup of proxy user credentials 6 of FIG. 2 or cached access tokens to enable access to target cloud-storage allocation units.

For performing write operations, privacy gateway 4 further includes a file-chunking component 26 configured for decomposing user data files into smaller chunk files. Optionally, a de-duplication component 28 is configured for generating unique signatures based on each chunk file's data. In implementations employing de-duplication component 28, de-duplication component 28 can also use signature-lookup component 16 to update metadatabase 8.

An encryption component 30 is configured for using IV-lookup component 18 to generate user-specific encryption keys in memory to encrypt each chunk file while being recorded into target cloud-storage allocation units. A cloud-writer component 32 is configured for using storage-mapping component 22 to record encrypted chunk files (corresponding to user data files) into target cloud-storage allocation units.

For performing read operations, privacy gateway 4 further includes a cloud-reader component 34 configured for (1) using chunk-mapping component 14 for chunk-file lookup in metadatabase 8 and deciphering the chunk mapping for user data files, (2) using location-mapping component 20 for deciphering cloud locations for chunk files, and (3) retrieving chunk files from cloud-storage allocation units using signature-lookup component 16 to obtain signatures.

A cloud-authentication component 36 is configured for using credential-lookup component 24 to authenticate cloud-writer component 32 or cloud-reader component 34 into cloud-storage allocation units. A decryption component 38 is configured for using IV-lookup component 18 to generate user-specific decryption keys in memory to decrypt each chunk file while being retrieved from target cloud-storage allocation units.

A file-reassembly component 40 is configured for using chunk-mapping component 14 to lookup the mapping between user data files and corresponding chunk files in order to concatenate the chunk files into an original correct order for reconstituting user data files. A gateway-sender component 40 is configured for sending data streams corresponding to fully-reconstituted user data files to end-user device requesting data.

FIG. 5A is a simplified flowchart of the major process steps for performing a write operation using the system architecture FIG. 2, according to embodiments of the present invention, according to embodiments of the present invention. The write process starts with a user requesting to write a file (Step 50). Privacy gateway 4 receives the write request, and maps user to the storage unit with the most available free space (Step 52).

Privacy gateway 4 then "chunks" the write payload into smaller pieces of a preconfigured size (Step 54). The proxy user of privacy gateway 4 encrypts each write-payload chunk using the user's encryption keys (i.e., via the appropriate encryption channel) (Step 56) until the write request for each payload chunk is satisfied (Step 58). Privacy gateway 4 then updates metadatabase 8 (Step 60) to reflect the actual location of the chunk files in the cloud-storage unit (e.g., which storage unit, relative path, sequence number, and size).

The process for reading a file is similar to the write process above, simply reversing the steps. The process for writing a file is as follows.

1. User endpoint B reads a file from cloud network 2.
2. The read request first reaches privacy gateway 4.
3. Privacy gateway 4 makes looks in metadatabase 8 to identify the location of the chunk files which comprise the file in question. The chunk files may be recorded secondary B located in primary storage D (i.e., the cloud-storage account of end user D).
4. Each chunk file in secondary B located in primary storage D is read using proxy user credentials 6, and sent to privacy gateway 4.
5. Each chunk file is individually decrypted by privacy gateway 4 using encryption channel B.
6. All chunk files are reassembled by privacy gateway 4 in the right sequence to regenerate the original file.
7. The file is then supplied to user endpoint B.

FIG. 5B is a simplified flowchart of the major process steps for performing a read operation using the system architecture FIG. 2, according to embodiments of the present invention, according to embodiments of the present invention. The read process starts with a user requesting to read a file (Step 70). Privacy gateway 4 receives the read request, and performs a lookup in metadatabase 8 to determine the actual location of relevant data chunk files that comprise the read request (Step 72). The proxy user of privacy gateway 4 then satisfies the read request for each chunk file (Step 74), and decrypts each chunk file (Step 76).

Privacy gateway 4 then reassembles the chunk files in the right sequence using information from metadatabase 8 to regenerate the original file (Step 78), and supplies the regenerated file to the user (Step 80).

All read/write operations performed by the proxy user of privacy gateway 4 are of encrypted data only. Even in cases where a malicious actor may choose to use proxy user credentials 6 to explore the contents of files in various cloud storage units, the result of such searching will be encrypted files that the malicious actor will not be able to decipher.

While the present invention has been described with respect to a limited number of embodiments, it will be appreciated that many variations, modifications, and other applications of the present invention may be made.

What is claimed is:

1. A method for contiguous utilization of individual end-user-based cloud-storage subscriptions, the method comprising the steps of:
   (a) upon receiving a write request for writing a data file into at least one cloud-storage allocation unit, identifying unused available storage in said at least one cloud-storage allocation unit, wherein said at least one cloud-storage allocation unit is partitioned to include primary storage areas and secondary storage areas with each said storage area having unique read/write privileges;
   (b) fragmenting said data file into chunk files;
   (c) encrypting each said chunk file;
   (d) writing said each chunk file exclusively to portions of said secondary storage areas of said at least one cloud-storage allocation unit, based on said unique read/write privileges, to satisfy said write request; and
   (e) updating a metadatabase having metadata associated with said data file and said chunk files, said step of updating includes mapping said secondary storage areas and associating said unique read/write privileges with said mapping.

2. The method of claim 1, the method further comprising the steps of:
   (f) upon receiving a read request for reading said data file from said at least one cloud-storage allocation unit, performing lookup in said metadatabase of said metadata;
   (g) reading said each chunk file from said at least one cloud-storage allocation unit;
   (h) decrypting said each chunk file;
   (i) reassembling said chunk files into said data file using said metadata; and
   (j) providing said data file to satisfy said read request.

3. The method of claim 2, wherein said step of reading and/or said step of reassembling include validating authorization to access said at least one cloud-storage allocation unit using at least one proxy user credential or at least one cached access token for specifying permissions for access to said secondary storage areas based on said unique read/write privileges, while having no access privileges in said primary storage areas.

4. The method of claim 1, wherein said metadata includes at least one informational tag selected from the group consisting of: a chunk name, a chunk location, a chunk signature, a unique chunk signature, a cloud-storage location, at least one proxy user credential, and at least one cached access token.

5. The method of claim 1, wherein said step of identifying and/or said step of writing include validating authorization to access said at least one cloud-storage allocation unit using at least one proxy user credential or at least one cached access token for specifying permissions for access to said secondary storage areas based on said unique read/write privileges, while having no access privileges in said primary storage areas.

6. The method of claim 1, wherein said step of encrypting is performed using initialization vectors (IVs) for generating non-persistent, user encryption keys in non-persistent memory to encrypt each chunk file while being recorded during said step of writing.

7. A system for contiguous utilization of individual end-user-based cloud-storage subscriptions, the system comprising:
   (a) a CPU for performing computational operations;
   (b) a memory for storing data and having computer-readable code embodied therein, wherein said computer-readable code includes program code for a privacy gateway, configured for providing the contiguous utilization of cloud storage, having:
      (i) program code for a gateway receiver configured for receiving a write request for writing a data file into at least one cloud-storage allocation unit and storing said data file in a cache of said memory, wherein said at least one cloud-storage allocation unit is partitioned to include primary storage areas and secondary storage areas with each said storage area having unique read/write privileges;
      (ii) program code for storage mapping configured for identifying unused available storage in said at least one cloud-storage allocation unit;
      (iii) program code for file-chunking configured for fragmenting said data file into chunk files;
      (iv) program code for encryption configured for encrypting each said chunk file;
      (v) program code for a cloud writer configured for writing said each chunk file exclusively to portions of said secondary storage areas of said at least one cloud-storage allocation unit, based on said unique read/write privileges, to satisfy said write request; and
      (vi) program code for metadata-lookup configured for performing lookup and/or updating a metadatabase having metadata associated with said data file and said chunk files, said updating includes mapping said secondary storage areas and associating said unique read/write privileges with said mapping.

8. The system of claim 7, wherein said program code for said gateway receiver is further configured for receiving a read request for reading said data file from said at least one cloud-storage allocation unit, and wherein said program code for said privacy gateway further includes:
   (vii) program code for a cloud reader configured for reading said each chunk file from said at least one cloud-storage allocation unit;
   (viii) program code for decryption configured for decrypting said each chunk file;
   (ix) program code for file reassembly configured for reassembling said chunk files into said data file using said metadata; and
   (x) program code for a gateway sender configured for providing said data file to satisfy said read request.

9. The system of claim 7, wherein said metadata includes at least one informational tag selected from the group consisting of: a chunk name, a chunk location, a chunk signature, a unique chunk signature, a cloud-storage location, at least one proxy user credential, and at least one cached access token.

10. The system of claim 7, wherein said program code for said privacy gateway further includes:
    (vii) program code for credential-lookup configured for performing lookup of at least one proxy user credential or at least one cached access token; and
    (viii) program code for cloud authentication configured for validating authorization to access said at least one cloud-storage allocation unit using said at least one proxy user credential or said at least one cached access token for specifying permissions for access to said secondary storage areas based on said unique read/write privileges, while having no access privileges in said primary storage areas.

11. The system of claim 8, wherein said program code for said storage-mapping is further configured for performing chunk mapping and performing location-mapping to map chunk names and chunk locations in said metadatabase.

12. The system of claim 7, wherein said program code for said privacy gateway further includes:
    (vii) program code for deduplication configured for generating unique signatures for said each chunk file; and
    (viii) program code for signature-lookup configured for performing lookup of said unique signatures in said metadatabase.

13. The system of claim 7, wherein said program code for said privacy gateway further includes:
    (vii) program code for initialization vector-lookup configured for creating and performing lookup of initialization vectors (IVs) for generating non-persistent, user encryption keys in non-persistent memory to encrypt each chunk file while being recorded during said writing.

14. A non-transitory computer-readable storage medium, having computer-readable code embodied on the non-transitory computer-readable storage medium, for contiguous utilization of individual end-user-based cloud-storage subscriptions, the computer-readable code comprising:
    (a) program code for, upon receiving a write request for writing a data file into at least one cloud-storage allocation unit, identifying unused available storage in said at least one cloud-storage allocation unit, wherein said at least one cloud-storage allocation unit is partitioned to include primary storage areas and secondary storage areas with each said storage area having unique read/write privileges;
    (b) program code for fragmenting said data file into chunk files;
    (c) program code for encrypting each said chunk file;
    (d) program code for writing said each chunk file exclusively to portions of said secondary storage areas of said at least one cloud-storage allocation unit, based on said unique read/write privileges, to satisfy said write request; and
    (e) program code for updating a metadatabase having metadata associated with said data file and said chunk files, said updating includes mapping said secondary storage areas and associating said unique read/write privileges with said mapping.

15. The non-transitory computer-readable storage medium of claim 14, the computer-readable code further comprising:
    (f) program code for, upon receiving a read request for reading said data file from said at least one cloud-storage allocation unit, performing lookup in said metadatabase of said metadata;
    (g) program code for reading said each chunk file from said at least one cloud-storage allocation unit;
    (h) program code for decrypting said each chunk file;
    (i) program code for reassembling said chunk files into said data file using said metadata; and
    (j) program code for providing said data file to satisfy said read request.

16. The non-transitory computer-readable storage medium of claim 14, wherein said metadata includes at least one informational tag selected from the group consisting of: a chunk name, a chunk location, a chunk signature, a unique chunk signature, a cloud-storage location, at least one proxy user credential, and at least one cached access token.

17. The non-transitory computer-readable storage medium of claim 14, the computer-readable code further comprising:
   (f) program code for performing lookup of at least one proxy user credential or at least one cached access token; and
   (g) program code for validating authorization to access said at least one cloud-storage allocation unit using said at least one proxy user credential or said at least one cached access token for specifying permissions for access to said secondary storage areas based on said unique read/write privileges, while having no access privileges in said primary storage areas.

\* \* \* \* \*